United States Patent
Hata et al.

(10) Patent No.: US 7,900,965 B2
(45) Date of Patent: Mar. 8, 2011

(54) PRETENSIONER DEVICE AND METHOD OF MANUFACTURING THE SAME

(75) Inventors: Yasunori Hata, Aichi-ken (JP); Toshikazu Hoshino, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 12/552,791

(22) Filed: Sep. 2, 2009

(65) Prior Publication Data
US 2010/0052303 A1 Mar. 4, 2010

(30) Foreign Application Priority Data
Sep. 4, 2008 (JP) .................. 2008-227478

(51) Int. Cl.
*B60R 22/36* (2006.01)
(52) U.S. Cl. ....................................... 280/806
(58) Field of Classification Search .................. 280/806; 297/480, 482
See application file for complete search history.

(56) References Cited

U.S. PATENT DOCUMENTS

| | | | | | |
|---|---|---|---|---|---|
| 7,118,132 | B2 * | 10/2006 | Terasaki | ......................... | 280/806 |
| 7,338,083 | B2 * | 3/2008 | Sakata | ........................... | 280/806 |
| 7,618,064 | B2 * | 11/2009 | Kuroki | ........................... | 280/806 |
| 2004/0212188 | A1 * | 10/2004 | Terasaki | ....................... | 280/806 |

FOREIGN PATENT DOCUMENTS

JP 2005-81883 A 3/2005

* cited by examiner

*Primary Examiner* — Faye M. Fleming
(74) *Attorney, Agent, or Firm* — Roberts Mlotkowski Safran & Cole P.C.

(57) ABSTRACT

In a pretensioner device, a boot formed into a cylindrical shape covers a circumference of an elongated member, and a tip end of webbing inserted into an insertion hole of a joint anchor through a pair of through-holes formed on an upper end side of the boot is sewn at portions in front of and behind an insertion portion, whereby the boot is engaged with the elongated member. The insertion hole of the joint anchor is exposed to outside of the boot through the pair of through-holes of the boot even in a state in which the elongated member is covered with the boot. Therefore, positional shift of the boot relative to the webbing is prevented, and sewing operation of the webbing may be performed by inserting the tip end of the webbing into the insertion hole of the joint anchor after covering the elongated member with the boot.

12 Claims, 7 Drawing Sheets

PRETENSIONER DEVICE AND METHOD OF MANUFACTURING THE SAME

CROSS-REFERENCE TO RELATED APPLICATION

This application claims priority under 35 USC 119 from Japanese Patent Application No. 2008-227478 filed on Sep. 4, 2008, the disclosure of which is incorporated by reference herein.

BACKGROUND OF THE INVENTION

1. Field of the Invention

The present invention relates to a pretensioner device applied to a seat belt device for restraining a vehicle occupant by webbing and a method of manufacturing the same.

2. Description of the Related Art

Conventionally, the seat belt device having a configuration in which a tip end (tip end side) (a side opposite to a side engaged with a webbing wind-up device) of the webbing is coupled to a pretensioner through wire is known (refer to Japanese Patent Application Laid-Open (JP-A) No. 2005-81883, for example). In the seat belt device disclosed in the JP-A No. 2005-81883, the wire is covered with a cylindrical boot, thereby obtaining an excellent appearance.

In the above-described seat belt device, there is a case in which the boot is sewn to the tip end side of the webbing in order to prevent positional shift of the boot relative to the webbing. However, since it is required to perform such sewing operation of the boot after coupling the tip end side of the webbing to the wire by sewing, sewing processes are required twice, and this makes a manufacturing process complicated. Also, it is required to pass the webbing through the boot before coupling the tip end side of the webbing to the wire (elongated member), which also makes the manufacturing process complicated.

SUMMARY OF THE INVENTION

The present invention is achieved in consideration of the above-described fact, and the pretensioner device capable of preventing the positional shift of the boot relative to the webbing and of making the manufacturing process easier is provided.

A pretensioner device of a first aspect of the invention includes: an elongated member formed into an elongated shape, with an insertion hole into which a tip end (tip end side) of webbing for restraining a vehicle occupant is inserted provided on one end side in a longitudinal direction thereof, the elongated member being coupled to the webbing by sewing of the tip end of the webbing inserted into the insertion hole at portions in front of and behind an insertion site; a device main body attached to a vehicle body or a vehicle seat, with the other end side in the longitudinal direction of the elongated member engaged therewith, that operates to draw the elongated member in; and a boot formed of a flexible material into a cylindrical shape to cover a circumference of the elongated member, with an exposure hole for exposing the insertion hole to the outside provided on a tip end (tip end side) thereof, and with the tip end of the webbing engaged with the elongated member by the sewing being inserted into the insertion hole via the exposure hole.

In the pretensioner device of the first aspect of the invention, when the device main body operates, the elongated member, the other end in the longitudinal direction of which is engaged with the device main body, is drawn into the device main body. The one end in the longitudinal direction of the elongated member is coupled to the tip end side of the webbing for restraining the vehicle occupant, and restriction of the vehicle occupant by the webbing is improved by the above-described drawing.

Herein, in the pretensioner device, the boot formed of the flexible material into the cylindrical shape covers the circumference of the elongated member, and the webbing inserted into the insertion hole of the elongated member through the exposure hole formed on the tip end side of the boot is sewn at the portions in front of and behind the insertion, whereby the boot is engaged with the elongated member. Therefore, the positional shift of the boot relative to the elongated member and the webbing coupled thereto may be prevented.

In addition, since the tip end side of the webbing may be inserted into the insertion hole of the elongated member through the exposure hole of the boot even in a state in which the elongated member is covered with the boot, the sewing operation of the webbing may be performed after covering the elongated member with the boot. Therefore, the operation to pass the webbing through the boot may be omitted, so that the manufacturing process may be made easier. Also, the coupling of the webbing to the elongated member and the engagement of the boot with the elongated member may be completed by one sewing operation, so that this may also make the manufacturing process easier.

The pretensioner device of the first aspect of the invention may be configured such that the tip end of the boot is blocked.

Since the tip end (one end in an axial direction) of the cylindrically formed boot is blocked in the pretensioner device thus configured, on the tip end side of the boot, the elongated member is not exposed to outside of the boot from other than the exposure hole. Therefore, an excellent appearance may be obtained.

In the pretensioner device configured such that the tip end of the boot is blocked, the boot may be such that the exposure hole thereof opposes the insertion hole with the one end in the longitudinal direction of the elongated member being abutted to the tip end thereof.

In the pretensioner device thus configured, the exposure hole of the boot opposes the insertion hole of the elongated member by abutment of the one end in the longitudinal direction of the elongated member on the tip end of the boot. That is, the exposure hole and the insertion hole may be positioned by allowing the one end in the longitudinal direction of the elongated member to abut on the tip end of the boot, so that the tip end side of the webbing may be easily inserted into the insertion hole through the exposure hole.

In the pretensioner device of the first aspect of the invention, the tip end of the boot may be configured such that the tip end side of the webbing is allowed to rotate relative to the boot around the insertion hole, by omitting a corner arranged in a width direction of the tip end side of the webbing in the coupled state of the webbing.

In the pretensioner device thus configured, on the tip end of the boot, the corner arranged in the width direction of the tip end side of the webbing in a state in which the tip end side of the webbing is coupled to the elongated member is omitted, and this allows the rotation of the tip end side of the webbing relative to the boot around the insertion hole. Therefore, even when the webbing for restraining the vehicle occupant moves by movement of the vehicle occupant or the like, the tip end side of the webbing rotates relative to the boot around the insertion hole, so that bend and fold of the boot may be inhibited, and the excellent appearance may be obtained.

A second aspect of the invention is provided by a method of manufacturing a pretensioner device, including: providing an elongated member formed into an elongated shape with an insertion hole provided on one end side in a longitudinal direction thereof, and with the other end side in the longitudinal direction engaged with a device main body attached to a vehicle body or a vehicle seat, which operates to draw the elongated member in; providing a boot formed of a flexible material in a cylindrical shape with an exposure hole provided at a tip end (tip end side) thereof; inserting a tip end (tip end side) of webbing for restraining a vehicle occupant into the exposure hole and the insertion hole in a state in which the elongated member is covered with the boot and the insertion hole of the elongated member is exposed via the exposure hole; and folding the tip end of the webbing inserted into the exposure hole and the insertion hole, overlapping portions in front of and behind an insertion site of the webbing and sewing the overlapped portions.

As described above, according to the pretensioner device and the method of manufacturing the same according to the invention, the positional shift of the boot relative to the webbing may be prevented and the manufacturing process thereof may be made easier.

DETAILED DESCRIPTION OF THE INVENTION

First Exemplary Embodiment

Figure 1:
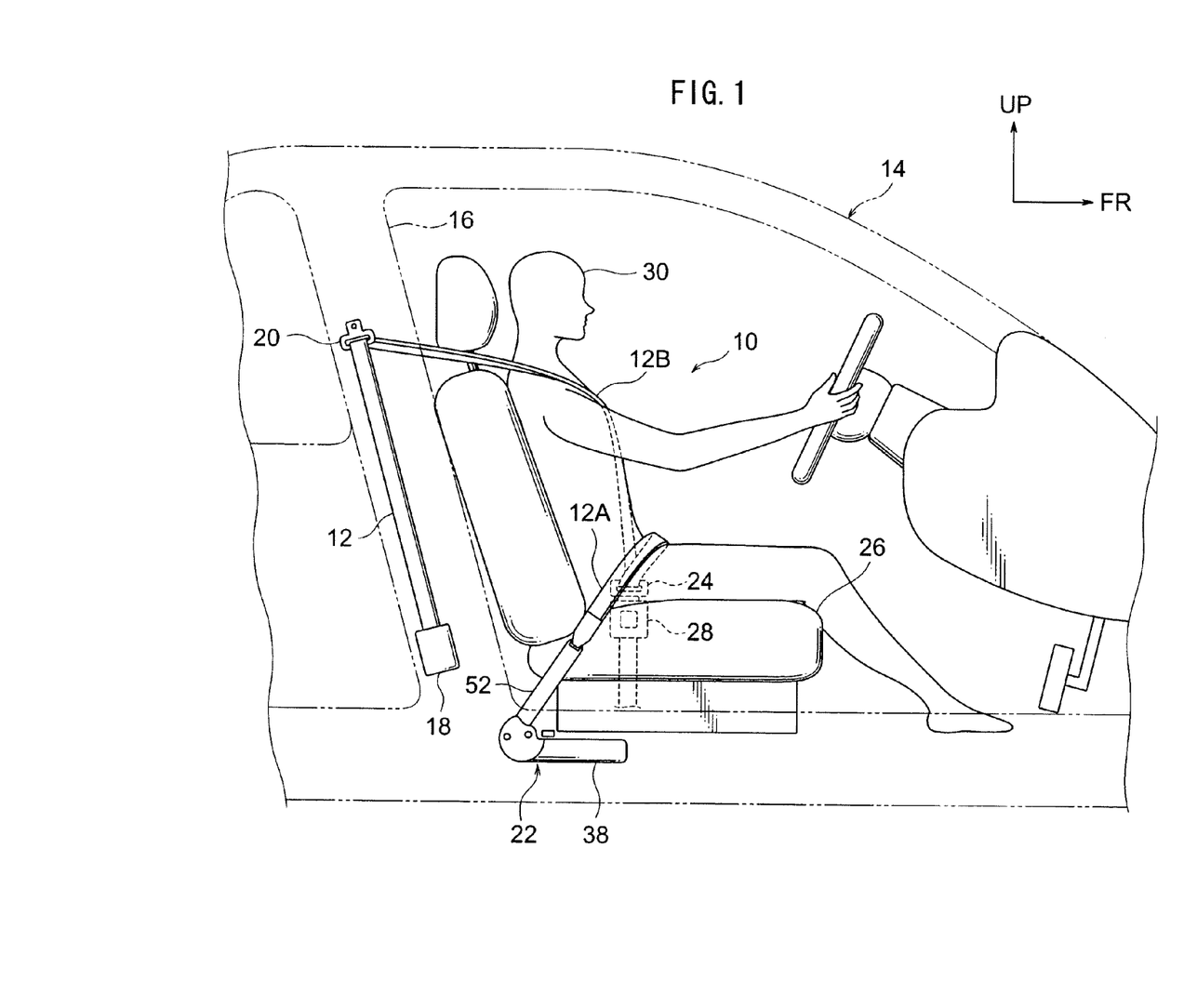
FIG. 1 is a schematic side view showing a configuration of a seat belt device according to a first exemplary embodiment of the present invention.

FIG. 1 is a schematic side view of a partial configuration of a vehicle equipped with a vehicle seat belt device 10 according to a first exemplary embodiment of the present invention. Meanwhile, an arrow FR in the drawing indicates a forward direction of the vehicle, and an arrow UP indicates an upward direction of the vehicle.

The seat belt device 10 is a so-called three-point seat belt device provided with webbing 12 formed into an elongated strip for restraining a vehicle occupant. A base end (one end in a longitudinal direction) of the webbing 12 is engaged with a wind-up shaft (not shown) of a retractor 18 fixed to a lower end of a center pillar 16 of a vehicle 14, and the wind-up shaft is always biased in a wind-up rotation direction of the webbing 12 by biasing force of a biasing member (not shown).

An intermediate portion (intermediate portion in the longitudinal direction) of the webbing 12 is wrapped around a slip joint 20 provided on an upper portion of the center pillar 16 and is folded back, and a tip end (the other end in the longitudinal direction) of the webbing 12 is coupled to a pretensioner device 22 provided in the vicinity of the lower end of the center pillar 16.

Also, a tongue plate 24 is slidably attached to the intermediate portion of the webbing 12, between the slip joint 20 and the pretensioner device 22. The tongue plate 24 is to be coupled to a buckle device 28 attached to a vehicle body at the opposite side of a seat 26 to the retractor 18.

When a vehicle occupant 30 who sits on the seat 26 couples the tongue plate 24 to the buckle device 28, a portion between the tongue plate 24 and the pretensioner device 22 of the webbing 12 becomes wrap webbing 12A for restraining a lumber area of the vehicle occupant 30, and a portion between the slip joint 20 and the tongue plate 24 of the webbing 12 becomes shoulder webbing 12B for restraining an upper body of the vehicle occupant 30.

Next, a configuration of the pretensioner device 22 according to the first exemplary embodiment is described.

Figure 2:
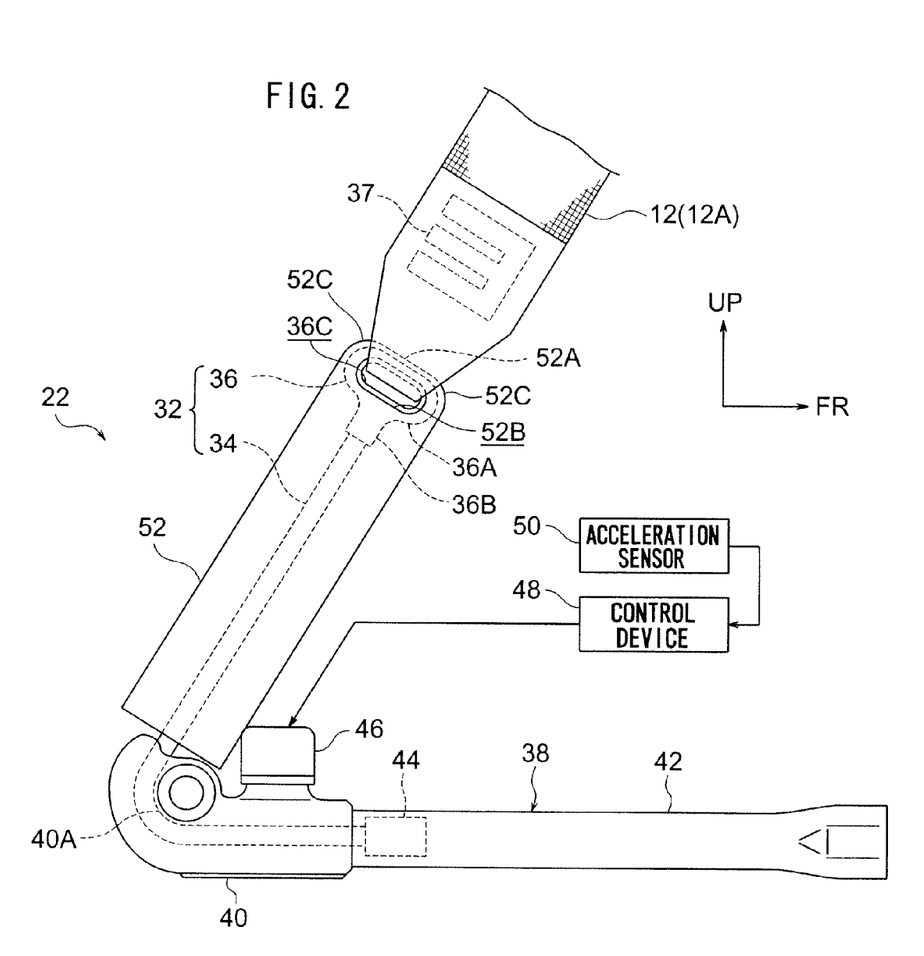
FIG. 2 is a schematic side view showing a configuration of a pretensioner device, which is a component of the seat belt device shown in FIG. 1.

As shown in FIG. 2, the pretensioner device 22 according to the first exemplary embodiment is provided with an elongated member 32. The elongated member 32 has elongated wire 34 and a joint anchor 36 fixed to one end in a longitudinal direction (an upper end in FIG. 2) of the wire 34. The joint anchor 36 is provided with a main body 36A formed into an oblong ring and an engaging portion 36B, which protrudes to one side in a short axis direction of the main body 36A, and the engaging portion 36B is engaged with (fixed to) the one end in the longitudinal direction of the wire 34.

An oblong insertion hole 36C is formed on a central portion of the main body 36A of the joint anchor 36, and a tip end side (tip end) of the webbing 12 is inserted into the insertion hole 36C. The tip end side of the webbing 12 inserted into the insertion hole 36C is such that portions in front of and behind the insertion are overlapped to be sewn with thread 37. Thus, the tip end side of the webbing 12 is coupled to the one end in the longitudinal direction of the wire 34 through the joint anchor 36.

One end side in the longitudinal direction of the wire 34 extends from the joint anchor 36 toward a rear lower side of the vehicle, and the other end side in the longitudinal direction of the wire 34 is inserted into a base cartridge 40, which configures a device main body 38 of the pretensioner device 22. The base cartridge 40 is formed into a substantial cylindrical shape with an axial direction along a vehicle front-rear direction, and is fixed in the vicinity of the lower end of the center pillar 16 of the vehicle 14.

An arc-shaped wire wrapping portion 40A is provided on a rear end side (one end side in the axial direction) of the base cartridge 40, and the other end side in the longitudinal direction of the wire 34 inserted into the base cartridge 40 from the rear end side of the base cartridge 40 is wrapped around the wire wrapping portion 40A and is extended toward a front end side of the base cartridge 40.

A cylinder 42 formed into an elongated cylindrical shape is provided on the front end side of the base cartridge 40. The cylinder 42 is arranged coaxially with the base cartridge 40, and one end in the axial direction (a rear end) thereof is fixed to the base cartridge 40. A piston 44 is provided in the cylinder 42. The piston 44 is generally arranged on a rear end side (a left side in FIG. 2) of the cylinder 42, and the other end in the longitudinal direction of the wire 34 is engaged with the piston 44.

Also, a gas generator 46 is attached to an upper portion of the base cartridge 40. The gas generator 46 is configured to feed high-pressure gas in the cylinder 42 by operation of an ignition device not shown, and the piston 44 is moved to a front end side of the cylinder 42 by the pressure of the gas. In this way, it is configured such that the wire 34 of the elongated member 32 is drawn into the device main body 38.

Meanwhile, the above-described ignition device is electrically connected to a control device 48 (refer to FIG. 2) mounted on the vehicle 14. The control device 48 is electrically connected to an acceleration sensor 50 mounted on the vehicle 14 to activate the ignition device when the acceleration sensor 50 detects predetermined acceleration (deceleration).

Further, the pretensioner device 22 according to the first exemplary embodiment is provided with a boot 52, which covers one end side in a longitudinal direction of the elongated member 32 (a portion arranged outside of the device main body 38). The boot 52 is formed of a resin material and artificial leather into a thin and elongated square tube shape, and has flexibility.

A length dimension of the boot 52 is set so as to correspond to a length dimension of the one end side in the longitudinal direction of the elongated member 32 arranged outside of the device main body 38 in a normal state before operation of the gas generator 46 (a state shown in FIG. 2). It is configured such that the one end side in the longitudinal direction of the elongated member 32 is inserted into the boot 52 from an opening on a base end side (one end side in the axial direction, lower end side in the first exemplary embodiment) of the boot 52, and a circumference thereof is covered with the boot 52.

Meanwhile, a width dimension W of the boot 52 (refer to FIG. 3) is set so as to be slightly larger than the length dimension in a long axis direction (a longitudinal direction) of the main body 36A of the joint anchor 36, and a thickness dimension T of the boot 52 (refer to FIG. 3) is set so as to be slightly larger than a thickness dimension of the joint anchor 36 along a central axis direction (a direction perpendicular to a plane of paper in FIG. 2) of the insertion hole 36C.

Figure 3:
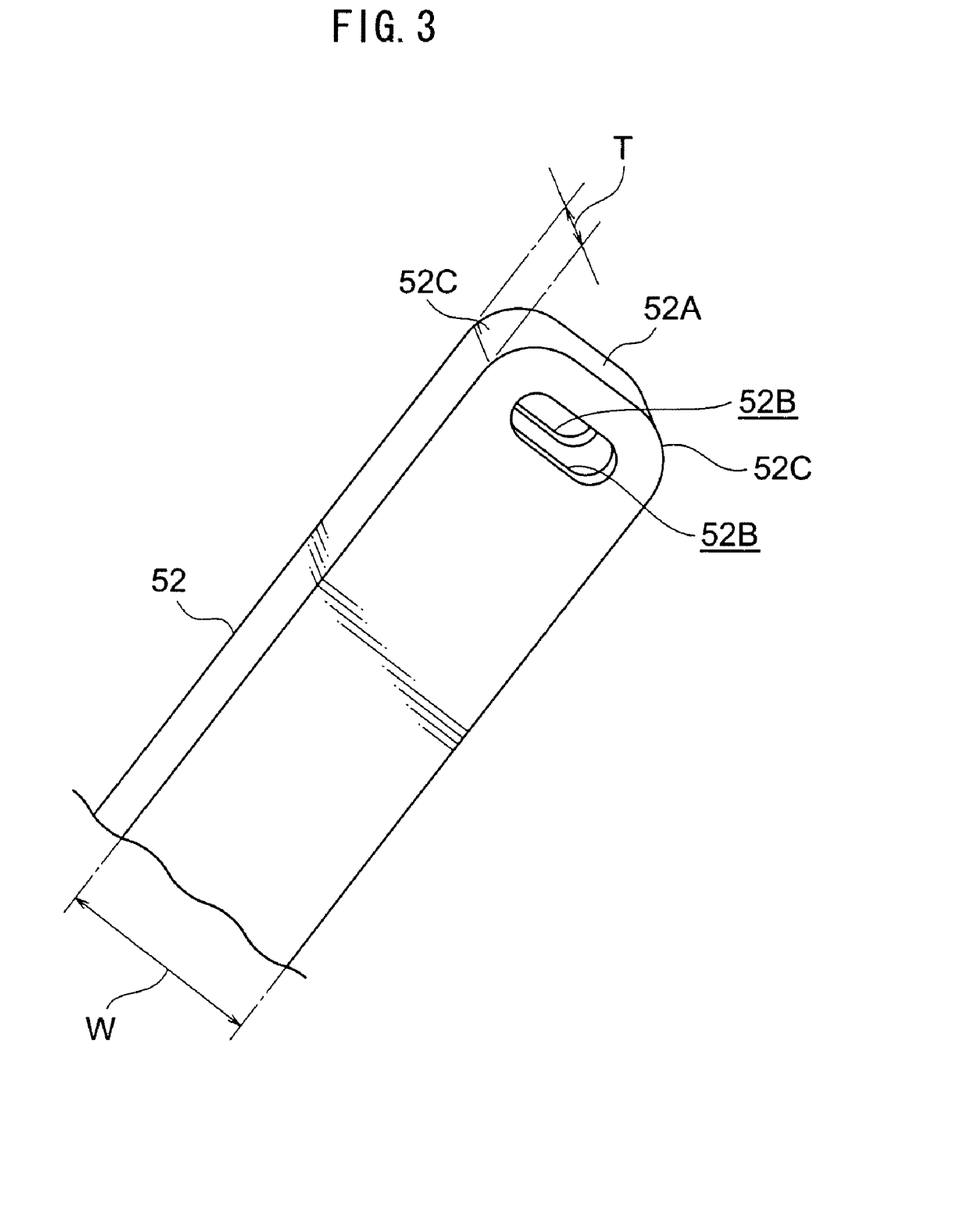
FIG. 3 is a perspective view showing a partial configuration of a boot, which is a component of the pretensioner device shown in FIG. 2.

As shown in FIG. 3, an opening on the tip end side (the other end side in the axial direction, an upper end side in the first exemplary embodiment) of the boot 52 is blocked by a blocking portion 52A, and the elongated member 32 inserted into the boot 52 is configured such that an upper end of the joint anchor 36 abuts on the blocking portion 52A.

Also, a pair of through-holes 52B as exposure holes is formed on the upper end side of the boot 52. The through-holes 52B are arranged so as to be opposed to each other in the thickness direction of the boot 52, and are opposed to the insertion hole 36C of the joint anchor 36 in a state in which the upper end of the joint anchor 36 abuts on the blocking portion 52A. In this state, the insertion hole 36C is configured to be exposed to outside of the boot 52 through the pair of through-holes 52B.

Herein, in the pretensioner device 22, when coupling the tip end side of the webbing 12 to the elongated member 32 (joint anchor 36), it is configured such that the one end side in the longitudinal direction of the elongated member 32 is covered with the boot 52, and the tip end side of the webbing 12 is inserted into the insertion hole 36C through the pair of through-holes 52B, then the portions in front of and behind the insertion are overlapped to be sewn.

Also, on the upper end of the boot 52, in a state in which the tip end side of the webbing 12 is coupled to the elongated member 32, corners arranged in the width direction (an arrow W direction in FIG. 3) of the tip end side of the webbing 12 are omitted, and a pair of curved surface portions 52C are provided on the upper end of the boot 52 (the upper end of the boot 52 is roundly cut). Thus, it is configured such that rotation of the tip end side of the webbing 12 relative to the boot 52 around the pair of through-holes 52B (around the insertion hole 36C) (relative rotation around a center S in FIG. 4, refer to arrows A and B in FIG. 4) is allowed.

Next, operation of the first exemplary embodiment is described.

In the seat belt device 10 thus configured, when the acceleration sensor 50 detects the predetermined acceleration in a state in which the vehicle occupant 30 wears the webbing 12 and the vehicle 14 is running, the control device 48 activates the gas generator 46 of the pretensioner device 22. When the gas generator 46 operates, the high-pressure gas is fed into the cylinder 42, and the piston 44 is moved to the front end side of the cylinder 42 by the pressure of the gas. Thus, the wire 34 of the elongated member 32 is drawn into the device main body 38 and the tip end side of the webbing 12 (wrap webbing 12A) coupled to the joint anchor 36 is drawn in a device main body 38 side (the rear lower side of the vehicle). Thus, restriction of the vehicle occupant 30 by the wrap webbing 12 is improved.

Herein, in the pretensioner device 22 according to the first exemplary embodiment, the boot 52 formed of a flexible material into the cylindrical shape covers the circumference of the elongated member 32, and the webbing 12 inserted into the insertion hole 36C of the joint anchor 36 through the pair of through-holes 52B formed on the upper end side of the boot 52 is sewn at portions in front of and behind the insertion, whereby the boot 52 is engaged with the elongated member 32. Therefore, positional shift of the boot 52 relative to the elongated member 32 and the webbing 12 coupled thereto may be prevented.

In addition, the through-hole 36C of the joint anchor 36 is exposed to outside of the boot 52 through the pair of through-holes 52B of the boot 52 even in a state in which the elongated member 32 is covered with the boot 52, so that when manufacturing the seat belt device 10, sewing operation of the webbing 12 may be performed by inserting the tip end side of the webbing 12 into the insertion hole 36C of the joint anchor 36 after covering the elongated member 32 with the boot 52. Therefore, it is not necessary to pass the webbing 12 through the inside of the boot 52 before the sewing operation of the webbing 12, and this makes a manufacture process easier. Also the coupling of the webbing 12 to the elongated member 32 and the engagement of the boot 52 with the elongated member 32 may be completed by one sewing operation, and this also makes the manufacturing process easier.

Also, since in the pretensioner device 22 according to the first exemplary embodiment, the upper end of the boot 52 formed into the cylindrical shape is blocked by the blocking portion 52A, the elongated member 32 is not exposed to outside of the boot 52 from other than the pair of through-holes 52B on the upper end side of the boot 52. Therefore, an excellent appearance may be obtained.

Further, in the pretensioner device 22 according to the first exemplary embodiment, the upper end (the one end in the longitudinal direction of the elongated member 32) of the joint anchor 36 abuts on the blocking portion 52A of the boot 52, whereby the pair of through-holes 52B of the boot 52 oppose the insertion hole 36C of the joint anchor 36. That is, the pair of through-holes 52B and the insertion hole 36C may be positioned by allowing the upper end of the joint anchor 36 to abut on the blocking portion 52A of the boot 52, so that the tip end side of the webbing 12 may be easily inserted into the insertion hole 36C through the pair of through-holes 52B.

Figure 4:
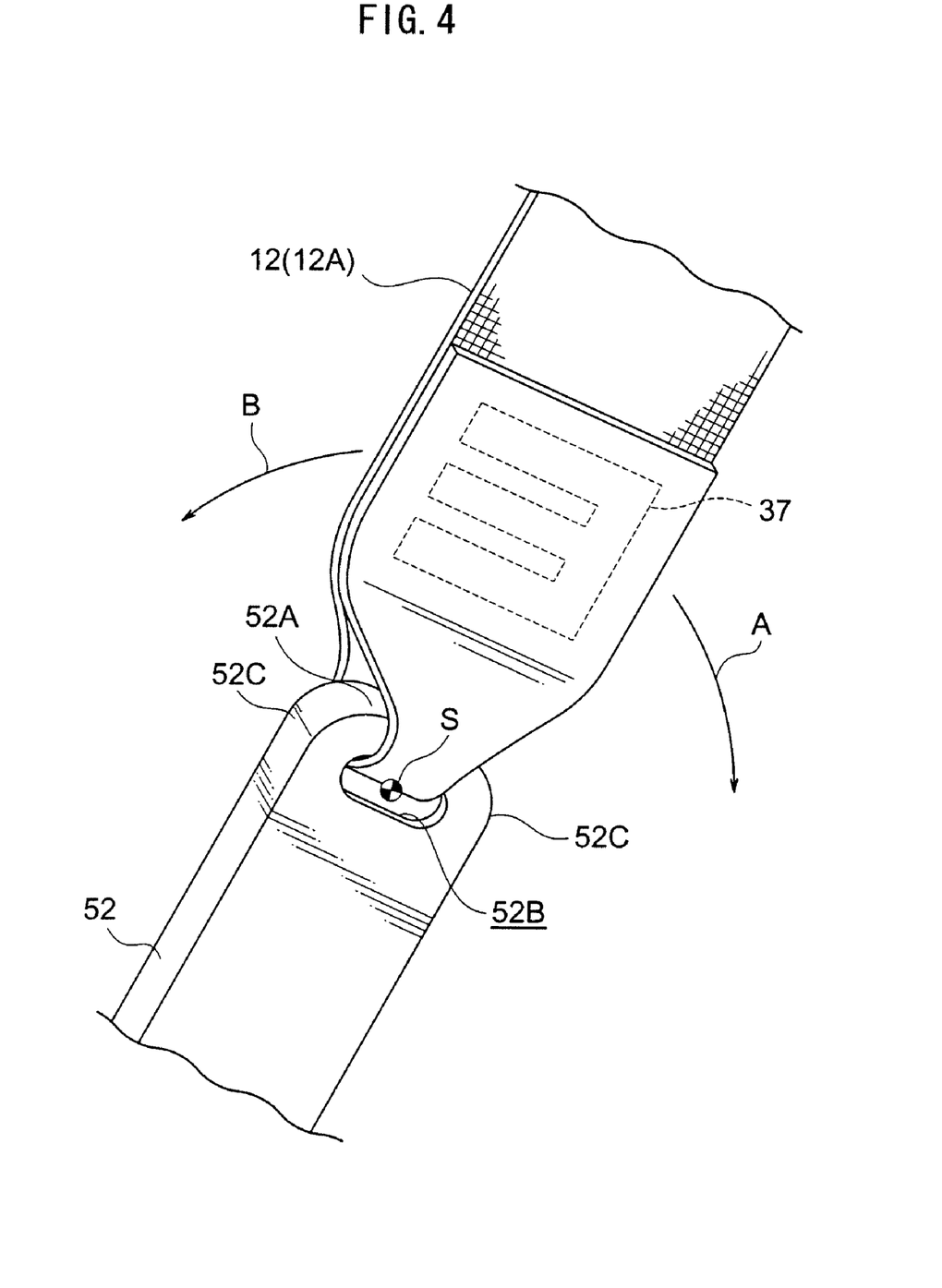
FIG. 4 is a perspective view for illustrating a rotation of webbing relative to the boot shown in FIG. 3.

Also, in the pretensioner device 22 according to the first exemplary embodiment, the pair of curved surface portions 52C are provided on the upper end of the boot 52, and this allows the tip end side of the webbing 12 to rotate relative to the boot 52 around the pair of through-holes 52B (around the insertion hole 36C). Therefore, even when the webbing 12, which restrains the vehicle occupant 30, moves due to movement of the vehicle occupant, the tip end side of the webbing 12 may rotate relative to the boot 52, thereby inhibiting bend and fold of the boot 52, so that an excellent appearance may be obtained.

Further, the pretensioner device 22 according to the first exemplary embodiment is not configured to insert the webbing 12 into the inside of the boot 52, so that the width dimension W of the boot 52 may be set so as to correspond to the dimension of the joint anchor 36. Thus, for example, the width dimension W of the boot 52 may be made narrow to substantially two-thirds of the width dimension of the webbing 12, so that the entire device may be made smaller.

Meanwhile, although the elongated member 32 is configured to be provided with the wire 34 and the joint anchor 36 in the first exemplary embodiment, the invention is not limited to this, and a configuration in which the joint anchor 36 is omitted, and one end side in the longitudinal direction of the wire 34 is curled to form a loop to be engaged and an inner side of the loop is made the insertion hole is possible.

Next, another exemplary embodiment of the invention is described. Meanwhile, the same reference numeral as that of the first exemplary embodiment is given to the configuration and operation basically similar to those of the first exemplary embodiment, and the description thereof is omitted.

Second Exemplary Embodiment

Figure 5:
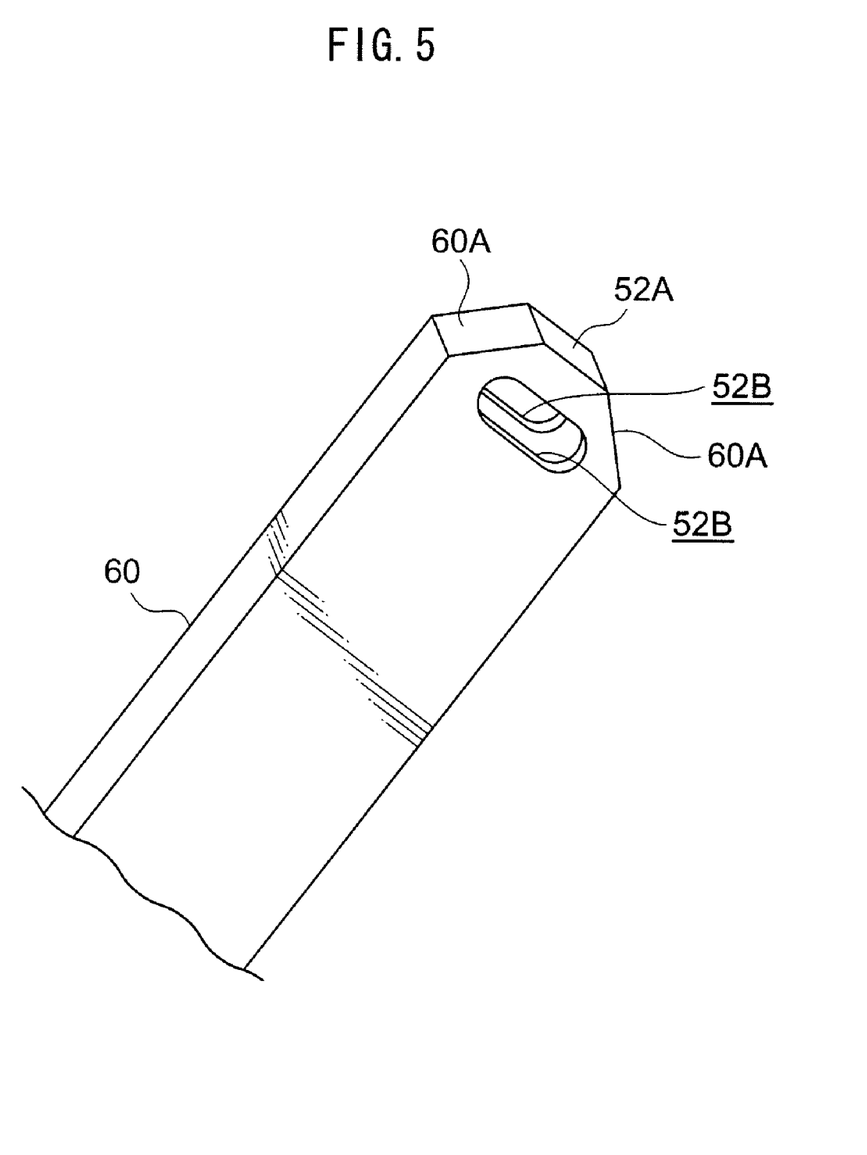
FIG. 5 is a perspective view showing a partial configuration of the boot, which is the component of the pretensioner device according to a second exemplary embodiment of the invention.

FIG. 5 is a perspective view of a partial configuration of a boot 60, which is a component of the pretensioner device according to a second exemplary embodiment of the invention. Although the boot 60 has the basically similar configuration as that of the boot 52 according to the first exemplary embodiment, this is provided with a pair of slanting surface portions 60A in place of the pair of curved surface portions 52C according to the first exemplary embodiment (the upper end of the boot 52 is obliquely cut). In this exemplary embodiment also, the tip end side of the webbing 12 may be rotated relative to the boot 52 around the pair of through-holes 52B, and this has a similar operational effect as in the first exemplary embodiment.

Third Exemplary Embodiment

Figure 6:
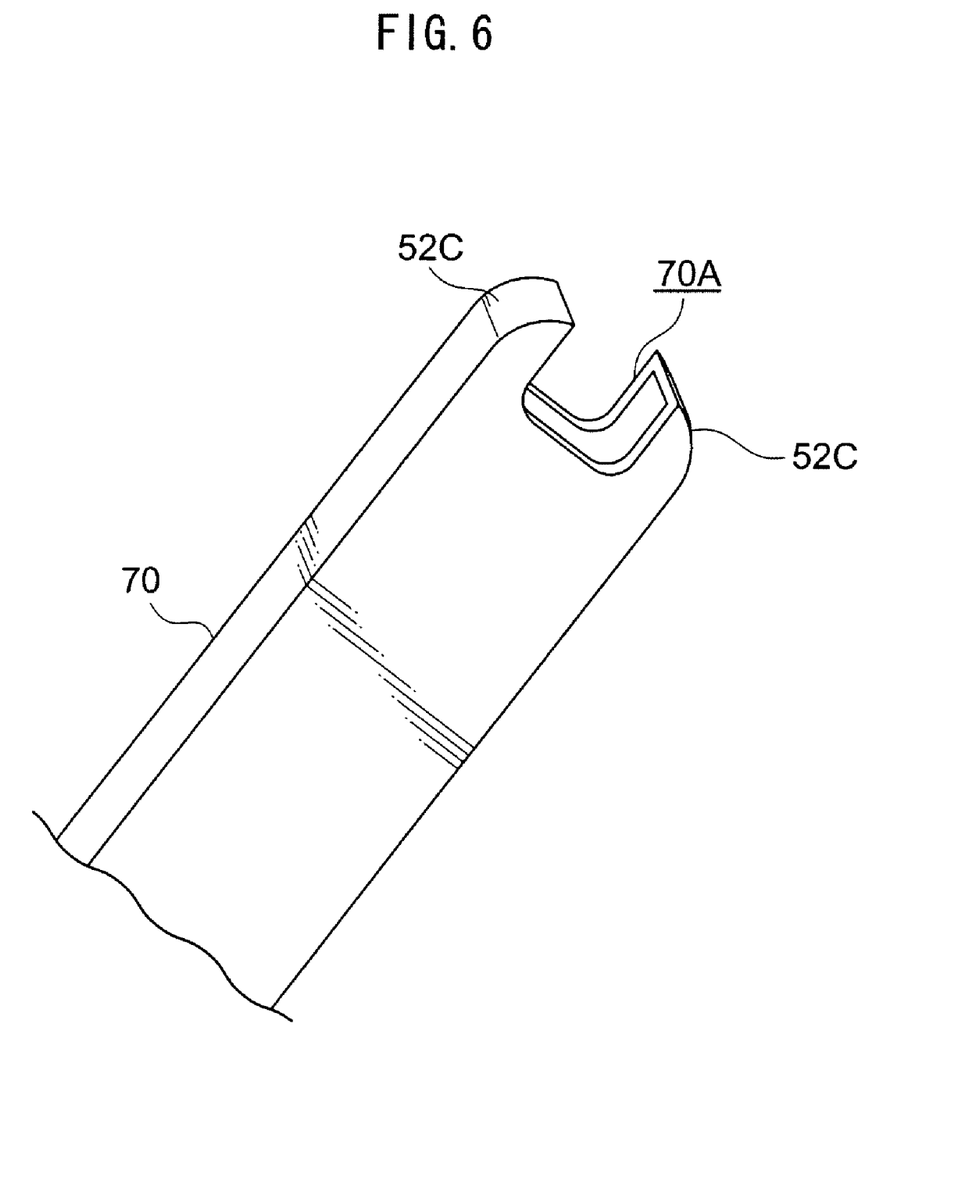
FIG. 6 is a perspective view showing a partial configuration of the boot, which is the component of the pretensioner device according to a third exemplary embodiment of the invention.

FIG. 6 is a perspective view of a partial configuration of a boot 70, which is a component of the pretensioner device according to a third exemplary embodiment of the invention. Although the boot 70 has the basically similar configuration as that of the boot 52 according to the first exemplary embodiment, an exposure hole 70A is provided on an upper end side of the boot 70 in place of the pair of through-holes 52B according to the first exemplary embodiment. The exposure hole 70A is formed by connecting the pair of through-holes 52B on the tip end side of the boot 52, in the boot 52 according to the first exemplary embodiment. In this exemplary embodiment also, the tip end side of the webbing 12 may be inserted into the insertion hole 36C of the joint anchor 36 through the exposure hole 70A, and this has the basically similar operational effect as in the first exemplary embodiment.

Fourth Exemplary Embodiment

Figure 7:
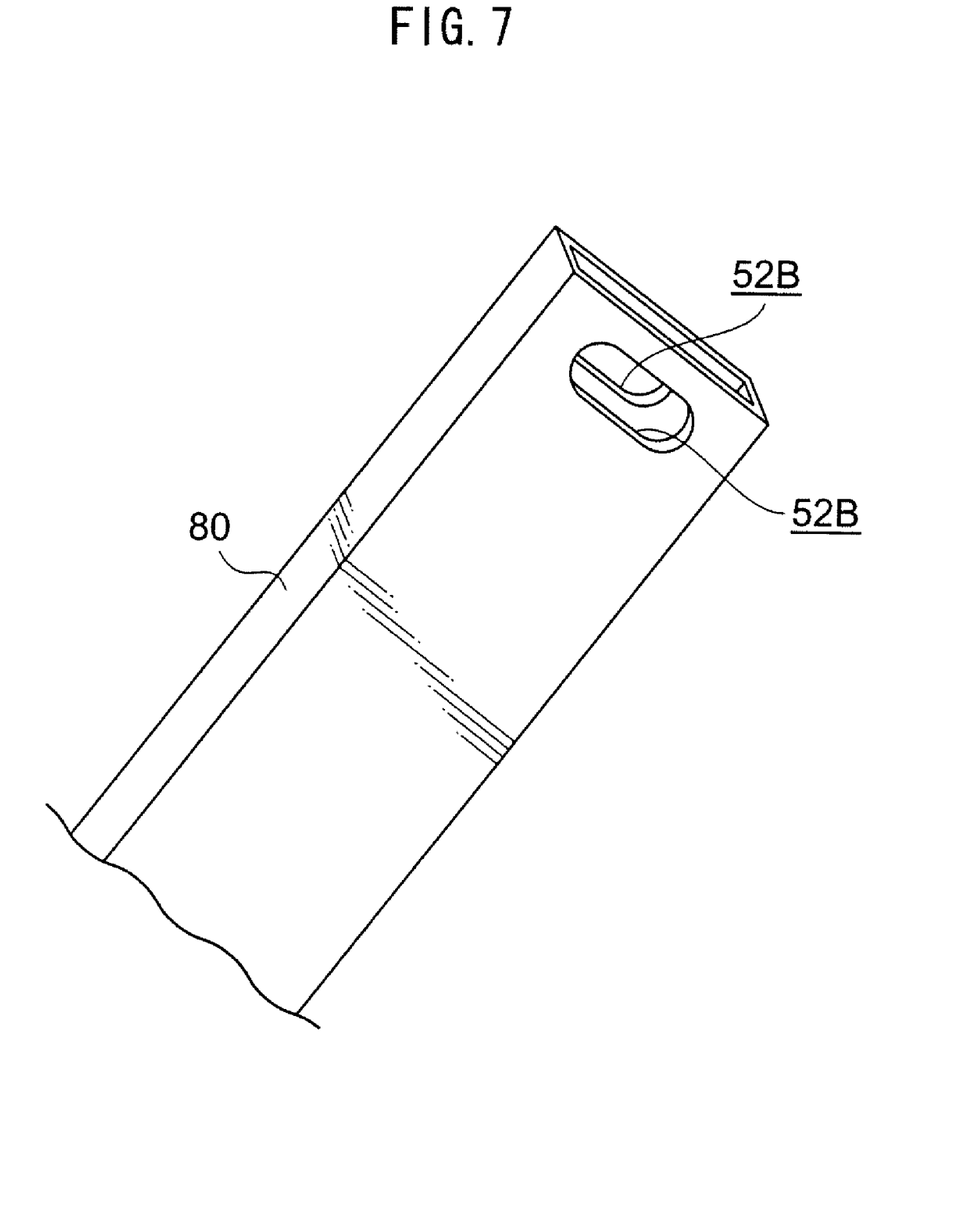
FIG. 7 is a perspective view showing a partial configuration of the boot, which is the component of the pretensioner device according to a fourth exemplary embodiment of the invention.

FIG. 7 is a perspective view of a partial configuration of a boot 80, which is a component of the pretensioner device according to a fourth exemplary embodiment of the invention. Although the boot 80 has the basically similar configuration as that of the boot 52 according to the first exemplary embodiment, the blocking portion 52A and the curved surface portions 52C according to the first exemplary embodiment are omitted. Therefore, an upper end opening of the boot 80 is opened. In this exemplary embodiment, since the boot 80 may be manufactured only by forming an elongated square tube-shaped member and forming the pair of through-holes 52B by cutting the same into a predetermined length, the boot 80 may be manufactured easily.

What is claimed is:

1. A pretensioner device comprising:
an elongated member formed into an elongated shape, with an insertion hole into which a tip end of webbing for restraining a vehicle occupant is inserted provided on one end side in a longitudinal direction thereof, the elongated member being coupled to the webbing by sewing of the tip end of the webbing inserted into the insertion hole at portions in front of and behind an insertion site;
a device main body attached to a vehicle body or a vehicle seat, with the other end side in the longitudinal direction of the elongated member engaged therewith, that operates to draw the elongated member in; and
a boot formed of a flexible material into a cylindrical shape to cover a circumference of the elongated member, with an exposure hole provided at a side face of the boot adjacent to a tip end thereof for exposing the insertion hole to the outside, and with the tip end of the webbing engaged with the elongated member by being inserted into the insertion hole via the exposure hole.

2. The pretensioner device of claim 1, wherein a tip end of the boot is blocked.

3. The pretensioner device of claim 2, wherein the exposure hole opposes the insertion hole with one end in the longitudinal direction of the elongated member being abutted to the tip end of the boot.

4. The pretensioner device of claim 1, wherein, at the tip end of the boot, a corner arranged in a width direction of the tip end of the webbing in the coupled state of the webbing is omitted, whereby the tip end of the webbing is allowed to rotate relative to the boot around the insertion hole.

5. The pretensioner device of claim 1, wherein a pair of curved surface portions is formed at the tip end of the boot.

6. The pretensioner device of claim 1, wherein a slanting surface portion inclined relative to the longitudinal direction is formed at the tip end of the boot.

7. The pretensioner device of claim 1, wherein an opening is formed at the tip end of the boot.

8. The pretensioner device of claim 1, wherein the elongated member comprises a ring-shaped joint anchor at one end in the longitudinal direction thereof, and the insertion hole is formed on the joint anchor.

9. The pretensioner device of claim 1, wherein the insertion hole of the elongated member is formed by engagement with a wire, one end side of the wire being curled into a loop shape.

10. A method of manufacturing a pretensioner device, comprising:
providing an elongated member formed into an elongated shape with an insertion hole provided on one end side in a longitudinal direction thereof, and with the other end side in the longitudinal direction engaged with a device main body attached to a vehicle body or a vehicle seat, which operates to draw the elongated member in;

providing a boot formed of a flexible material in a cylindrical shape with an exposure hole provided at a side face of the boot adjacent to a tip end thereof;

inserting a tip end of webbing for restraining a vehicle occupant into the exposure hole and the insertion hole in a state in which the elongated member is covered with the boot and the insertion hole of the elongated member is exposed via the exposure hole; and then folding the tip end of the webbing inserted into the exposure hole and the insertion hole, overlapping portions in front of and behind an insertion site of the webbing and sewing the overlapped portions.

11. The pretensioner device of claim 1, wherein the exposure hole of the boot is aligned with the insertion hole of the elongated member.

12. The method of manufacturing a pretensioner device of claim 10, further comprising aligning the exposure hole of the boot with the insertion hole of the elongated member prior to inserting a tip end of webbing for restraining a vehicle occupant into the exposure hole and the insertion hole.

* * * * *